(12) United States Patent
Sohma

(10) Patent No.: US 8,508,963 B2
(45) Date of Patent: Aug. 13, 2013

(54) STEP-DOWN SWITCHING REGULATOR CAPABLE OF PROVIDING HIGH-SPEED RESPONSE WITH COMPACT STRUCTURE

(75) Inventor: Shohtaroh Sohma, Ikeda (JP)

(73) Assignee: Ricoh Company, Ltd., Tokyo (JP)

(*) Notice: Subject to any disclaimer, the term of this patent is extended or adjusted under 35 U.S.C. 154(b) by 930 days.

(21) Appl. No.: 12/274,880

(22) Filed: Nov. 20, 2008

(65) Prior Publication Data

US 2009/0135632 A1 May 28, 2009

(30) Foreign Application Priority Data

Nov. 26, 2007 (JP) ................................. 2007-304055

(51) Int. Cl.
*G05F 1/56* (2006.01)
*G05F 1/563* (2006.01)
*G05F 1/565* (2006.01)
*G05F 1/575* (2006.01)

(52) U.S. Cl.
USPC .............. 363/89; 323/285; 323/288; 323/351

(58) Field of Classification Search
USPC ................. 323/224, 225, 268, 271, 282, 285, 323/288, 351
See application file for complete search history.

(56) References Cited

U.S. PATENT DOCUMENTS

| | | | |
|---|---|---|---|
| 2007/0063678 A1* | 3/2007 | Yoshikawa | 323/222 |
| 2007/0182395 A1* | 8/2007 | Sakai et al. | 323/283 |

FOREIGN PATENT DOCUMENTS

| | | |
|---|---|---|
| JP | 7-222439 | 8/1995 |
| JP | 2005-229744 | 8/2005 |
| JP | 2005-304218 | 10/2005 |
| JP | 3775240 | 3/2006 |
| JP | 2006-141191 | 6/2006 |
| JP | 2007-227763 | 9/2007 |
| JP | 2008-92635 | 4/2008 |
| JP | 2008-161001 | 7/2008 |
| KR | 1995-0020709 | 7/1995 |
| KR | 2000-0045903 | 7/2000 |
| KR | 10-2001-0037693 | 5/2001 |
| WO | WO2005/074110 | 8/2005 |

OTHER PUBLICATIONS

May 31, 2011 Korean official action in connection with a counterpart Korean patent application.
Mar. 29, 2012 Japanese official action in connection with a counterpart Japanese patent application.

\* cited by examiner

*Primary Examiner* — Adolf Berhane
*Assistant Examiner* — Nusrat Quddus
(74) *Attorney, Agent, or Firm* — Cooper & Dunham LLP

(57) ABSTRACT

In a step-down switching regulator, a switching element is a high-voltage NMOS transistor, turned on and off based on a control signal generated by a controller, and charges an inductor with an input voltage input to an input terminal. A first drive circuit is a low-voltage MOS transistor and turns on and off the switching element based on the control signal. A voltage generator generates a predetermined first power supply voltage not greater than a withstand voltage of the low-voltage MOS transistor. A capacitor is connected in parallel with the first drive circuit and stores charge from the voltage generator to supply power to the first drive circuit. One end of the capacitor is connected to a junction node between the switching element and the inductor, and the other end of the capacitor is supplied with the first power supply voltage generated by the voltage generator.

16 Claims, 5 Drawing Sheets

STEP-DOWN SWITCHING REGULATOR CAPABLE OF PROVIDING HIGH-SPEED RESPONSE WITH COMPACT STRUCTURE

BACKGROUND

1. Technical Field

The present specification describes a step-down switching regulator, and more particularly, a step-down switching regulator formed by integrating a high-voltage MOS transistor and a low-voltage MOS transistor in a single semiconductor chip.

2. Discussion of the Background

Switching regulators are electrical circuits for stabilizing an output voltage by high-speed on-off operation. When an input voltage is high, conventional switching regulators use high-voltage transistors for withstanding a voltage higher than the input voltage. However, the high-voltage transistors are larger in size, drive a smaller amount of current, and have a slower response speed than low-voltage transistors do.

Such switching regulators include a switching element in which a largest amount of current flows. By using a NMOS (negative channel metal oxide semiconductor) transistor rather than a PMOS transistor (positive channel metal oxide semiconductor), the switching element can achieve high efficiency in flowing a large amount of electrical current at a high speed.

However, in a case of a step-down switching regulator, when a NMOS transistor is used for the switching element, a drain of which is directly connected to an input voltage, since a source voltage increases up to about the input voltage when the NMOS transistor is turned on, a gate voltage for turning on the NMOS transistor needs to be greater than the input voltage.

To address this problem, a related-art switching regulator includes a bootstrap capacitor. The bootstrap capacitor generates a voltage greater than an input voltage to turn on and off the NMOS transistor switching element with the generated voltage.

However, even though the switching element uses the NMOS transistor, use of high-voltage transistors for all transistors included in the switching regulator results in an increase in chip area and a decrease in response speed.

Accordingly, there is a need for a technology to provide a step-down switching regulator capable of decreasing chip area and increasing response speed while withstanding high input voltage.

BRIEF SUMMARY

This patent specification describes a switching regulator, one example of which includes a switching element, a rectifier, a voltage generator, a capacitor, a first drive circuit, and a controller. The switching element is formed of a high-voltage NMOS transistor and turned on and off based on a control signal input to a gate, and configured to charge an inductor with an input voltage not smaller than a withstand voltage of a low-voltage MOS transistor but smaller than a withstand voltage of a high-voltage MOS transistor input to an input terminal. The rectifier is configured to discharge the inductor when the switching element is turned off to stop charging the inductor. The voltage generator is configured to generate a predetermined first power supply voltage not greater than a withstand voltage of the low-voltage MOS transistor. The first drive circuit is formed of a low-voltage MOS transistor and configured to turn the switching element on and off based on the input control signal. The capacitor is connected in parallel with the first drive circuit and configured to store charge from the voltage generator to supply power to the first drive circuit. One end of the capacitor is connected to a junction node between the switching element and the inductor, and the other end of the capacitor is supplied with the first power supply voltage generated by the voltage generator. The controller is configured to generate the control signal for turning on and off the switching element and output the control signal to the first drive circuit, such that the input voltage is converted into a predetermined constant voltage to be output from an output terminal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF ILLUSTRATIVE EMBODIMENTS

Figure 1:
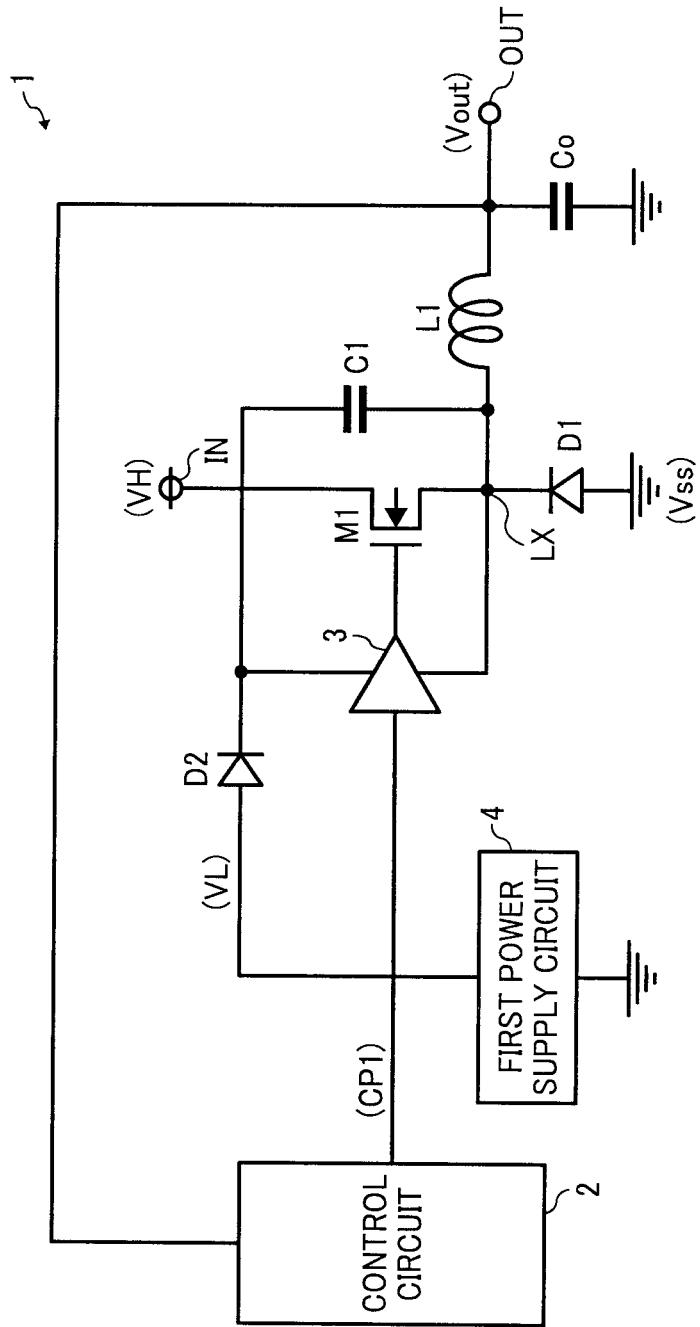
FIG. 1 is a circuit diagram of a step-down switching regulator according to an illustrative embodiment of the present disclosure.

In describing examples and embodiments illustrated in the drawings, specific terminology is employed for the sake of clarity. However, this disclosure is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, in particular to FIG. 1, a step-down switching regulator 1 according to one illustrative embodiment is explained.

FIG. 1 is a circuit diagram of the step-down switching regulator 1. The step-down switching regulator 1 includes an input terminal IN, an output terminal OUT, a switching transistor M1, diodes D1 and D2, a control circuit 2, a first drive circuit 3, an inductor L1, an output capacitor Co, a first power supply circuit 4, a bootstrap capacitor C1, and a junction node LX.

The step-down switching regulator 1, which is a step-down switching regulator of an asynchronous rectifying type formed by integrating a high-voltage MOS (metal oxide semiconductor) transistor and a low-voltage MOS transistor in a single chip, converts an input voltage VH applied to the input terminal IN into a predetermined constant voltage and outputs an output voltage Vout from the output terminal OUT.

The switching transistor Ml is a NMOS (negative channel metal oxide semiconductor) transistor performing switching operation for output control of the input voltage VH.

The control circuit 2 generates a pulse signal CP1 for switching of the switching transistor M1 so as to maintain the output voltage Vout at the predetermined voltage and outputs the pulse signal CP1. For example, the pulse signal CP1 is a PWM (pulse-width modulation) pulse signal for PWM control. The first drive circuit 3 is a buffer circuit for switching the switching transistor M1 on and off based on the pulse signal CP1 transmitted from the control circuit 2, and includes a low-voltage transistor.

It is to be noted that the switching transistor M1 serves as a switching element, the diode D1 serves as a rectifier, the first drive circuit 3 serves as a first drive circuit, the first power supply circuit 4 serves as a voltage generator, and the control circuit 2 serves as a controller, respectively. In the switching regulator 1, circuits other than the inductor L1 and the output capacitor Co may be integrated in a single IC (integrated circuit) chip. Alternatively, circuits other than the switching transistor M1 and/or the diode D1, the inductor L1, and the output capacitor Co may be integrated in a single IC chip.

Since the input voltage VH is smaller than a withstand voltage of the high-voltage MOS transistor but greater than a withstand voltage of the low-voltage MOS transistor, the switching transistor M1 uses a high-voltage NMOS transistor. The switching transistor M1 is connected between the input terminal IN and a cathode of the diode D1, and an anode of the diode D1 is connected to a ground potential Vss. The inductor L1 is connected between the junction node LX of the switching transistor M1 and the diode D1, and the output terminal OUT. The output capacitor Co is connected between a junction node between the inductor L1 and the output terminal OUT, and the ground potential Vss.

The first power source circuit 4 generates a predetermined power supply voltage VL smaller than a withstand voltage of the low-voltage MOS transistor and outputs the power supply voltage VL. The power supply voltage VL is input to a positive side power supply input terminal of the first drive circuit 3 through the diode D2. Note that the power supply voltage VL is a first power supply voltage. The bootstrap capacitor C1 is connected between a cathode of the diode D2 and the junction node LX. A negative side power supply input terminal of the first drive circuit 3 is connected to the junction node LX. Further, the pulse signal CP1 transmitted from the control circuit 2 is input to an input terminal of the first drive circuit 3, and an output terminal of the first drive circuit 3 is connected to a gate of the switching transistor M1.

When the output voltage Vout is 0 V, the bootstrap capacitor C1 is charged with the power supply voltage VL supplied by the first power source circuit 4 through the diode D2. A voltage calculated by subtracting a forward voltage of the diode D2 from the power supply voltage VL is applied between the positive side power supply input terminal of the first drive circuit 3 and the negative side power supply input terminal of the first drive circuit 3.

As the pulse signal CP1 is at a high level, an output signal transmitted from the first drive circuit 3 is also high. Under these conditions, the switching transistor M1 is turned on to be in a state of conduction (conductive state). Accordingly, as a voltage of the junction node LX increases, the output voltage Vout passing through the inductor L1 also increases. When this happens, a voltage of a terminal of the bootstrap capacitor C1 connected to the positive side power supply input terminal of the first drive circuit 3 increases above the power supply voltage VL, so the diode D2 is turned off. Thus, the bootstrap capacitor C1 supplies power to the first drive circuit 3.

Subsequently, when the pulse signal CP1 is at a low level, the switching transistor M1 is turned off to be in a shutoff state. Therefore, the inductor L1 is supplied with an electrical current from the ground potential Vss through the diode D1, and a voltage applied to the junction node LX becomes smaller than the ground potential Vss by an amount equal to a forward voltage of the diode D1. Accordingly, the bootstrap capacitor C1 is again supplied with the power supply voltage VL through the diode D2.

When the pulse signal CP1 is again at a high level, the output terminal of the first drive circuit 3 is high, so that the switching transistor M1 is turned on to be in a conductive state, thereby increasing the voltage of the junction node LX. When these operations are repeated, a voltage input to the positive side power supply input terminal of the first drive circuit 3 does not exceed the power source voltage VL.

According to the illustrative embodiment, in the switching regulator 1, serving as a step-down switching regulator, since the voltage input to the positive side power supply input terminal of the first drive circuit 3 does not exceed the power supply voltage VL, the first drive circuit 3 can use a low-voltage transistor, thereby decreasing chip size as well as enabling high-speed response.

Figure 2:
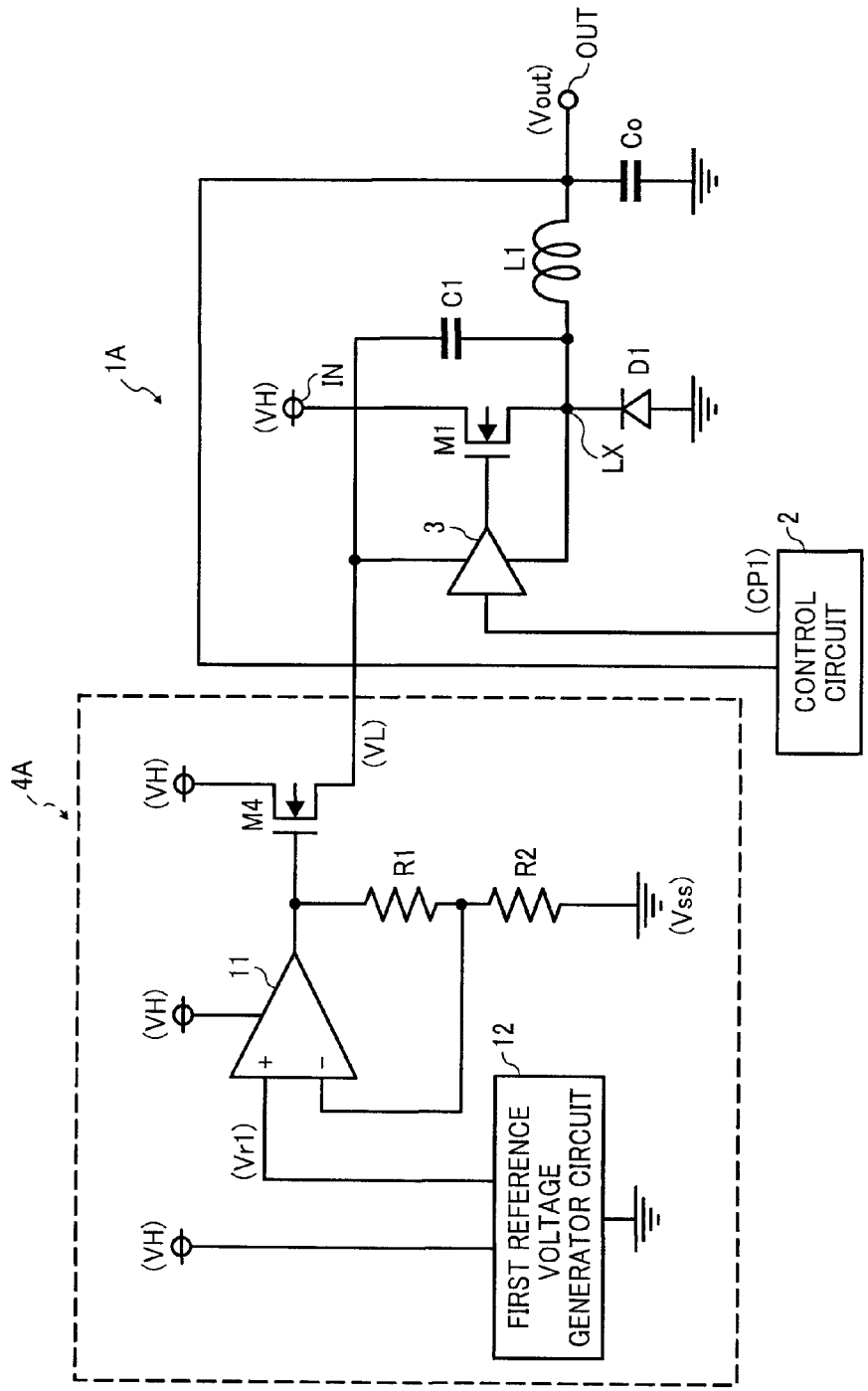
FIG. 2 is a circuit diagram of a step-down switching regulator according to another illustrative embodiment of the present disclosure.

Referring to FIG. 2, a description is now given of a step-down switching regulator 1A according to another illustrative embodiment.

FIG. 2 is a circuit diagram of the step-down switching regulator 1A. The switching regulator 1A includes a first power source circuit 4A. The first power source circuit 4A includes an operational amplifier 11, a first reference voltage generator circuit 12, a NMOS transistor M4, and resistors R1 and R2. Except that the switching regulator 1A does not include the diode D2 depicted in FIG. 1, the other elements of the switching regulator 1A are the same as those of the switching regulator 1 depicted in FIG. 1.

The switching regulator 1A, serving as a step-down switching regulator of an asynchronous rectifying type formed by integrating a high-voltage MOS (metal oxide semiconductor) transistor and a low-voltage MOS transistor in a single semiconductor chip, converts an input voltage VH applied to the input terminal IN into a predetermined constant voltage and outputs an output voltage Vout from the output terminal OUT.

The first power source circuit 4A generates a predetermined power supply voltage VL smaller than a withstand voltage of the low-voltage MOS transistor and outputs the power supply voltage VL to the positive side power supply input terminal of the first drive circuit 3. The bootstrap capacitor C1 is connected between the output terminal OUT and the junction node LX. The first reference voltage generator circuit 12 generates a predetermined first reference voltage Vr1 and outputs the first reference voltage Vr1.

It is to be noted that the first power supply circuit 4A serves as a voltage generator, the operational amplifier 11, the first reference voltage generator circuit 12, and the resistors R1 and R2 serve as a constant voltage circuit, and the NMOS transistor M4 serves as a first source follower circuit. In the switching regulator 1A, circuits other than the inductor L1 and the output capacitor Co may be integrated in a single IC. Alternatively, circuits other than the switching transistor M1 and/or the diode D1, the inductor L1, and the output capacitor Co may be integrated in a single IC.

In the first power source circuit 4A, the operational amplifier 11 and the first reference voltage generator circuit 12 are activated by input voltages VH, respectively, and include high-voltage MOS transistors, respectively. The first reference voltage Vr1 generated by the first reference voltage generator circuit 12 is input to a non-inverting input terminal of the operational amplifier 11, and an output terminal of the operational amplifier 11 is connected to a gate of the NMOS transistor M4. The resistors R1 and R2 are connected in series between the output terminal of the operational amplifier 11 and a ground potential Vss, and an inverting input terminal of the operational amplifier 11 is connected to a junction node between the resistors R1 and R2. The resistors R1 and R2, serving as a proportional voltage generator circuit, generate a voltage proportional to the output voltage of the constant voltage circuit.

The NMOS transistor M4 is a high-voltage MOS transistor, a drain of which is connected to an input voltage VH. Since the operational amplifier 11, the first reference voltage generator circuit 12, and the resistors R1 and R2 form a constant voltage circuit, a constant voltage is input to a gate of the NMOS transistor M4, and a power supply voltage VL is output from the source of the NMOS transistor M4. That is, the first power source circuit 4A provides the high-voltage NMOS transistor M4, serving as a source follower circuit, at an output terminal of the constant voltage circuit.

According to this illustrative embodiment, the switching regulator 1A achieves the same effect as that of the switching regulator 1 depicted in FIG. 1. In addition, the switching regulator 1A does not include the diode D2 depicted in FIG. 1, thereby decreasing the area of the switching regulator 1A. Moreover, since the first power supply circuit 4A includes the high-voltage NMOS transistor M4, serving as a source follower circuit, even when the operational amplifier 11 is formed of a high-voltage transistor having a decreased frequency characteristic, phase compensation of the operational amplifier 11, the first reference voltage generator circuit 12, and the resistors R1 and R2, serving as a constant voltage circuit, can be easily achieved, and response speed can be increased.

Figure 3:
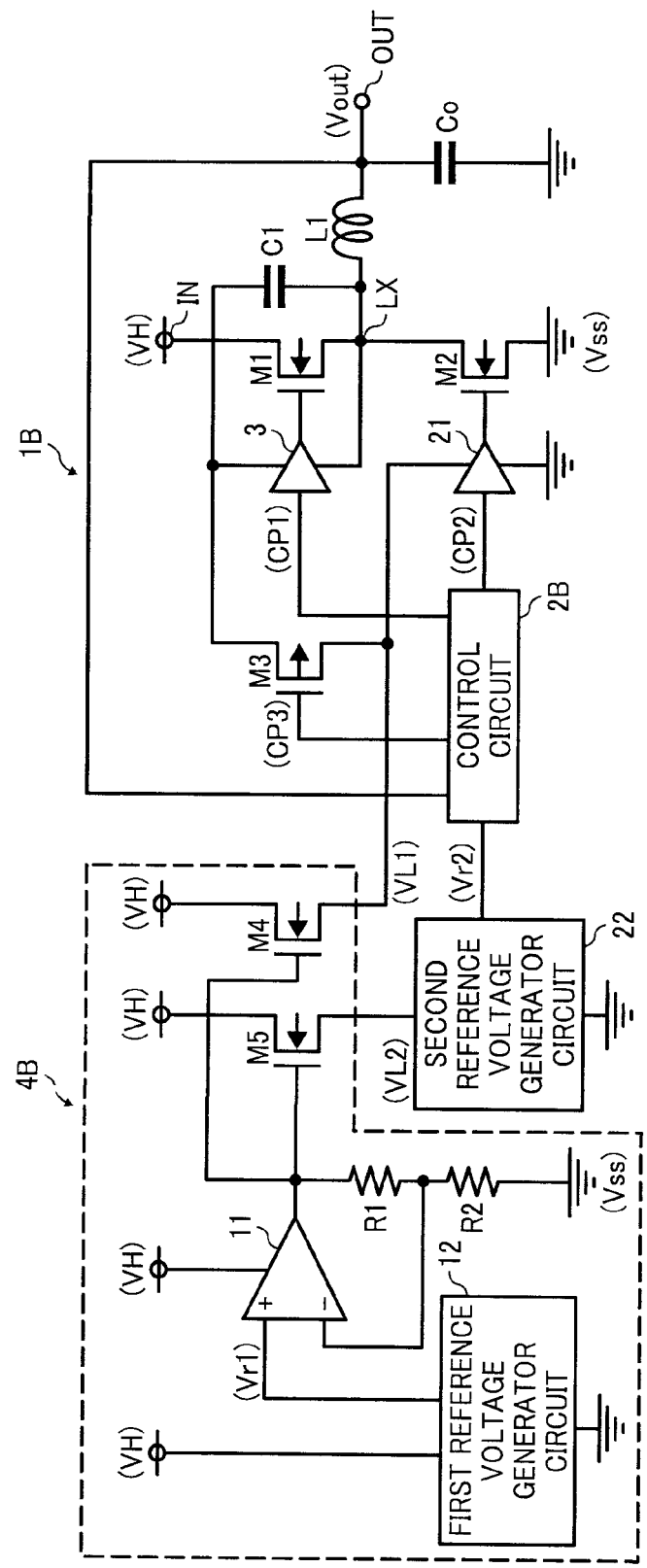
FIG. 3 is a circuit diagram of a step-down switching regulator according to yet another illustrative embodiment of the present disclosure.
Figure 4:
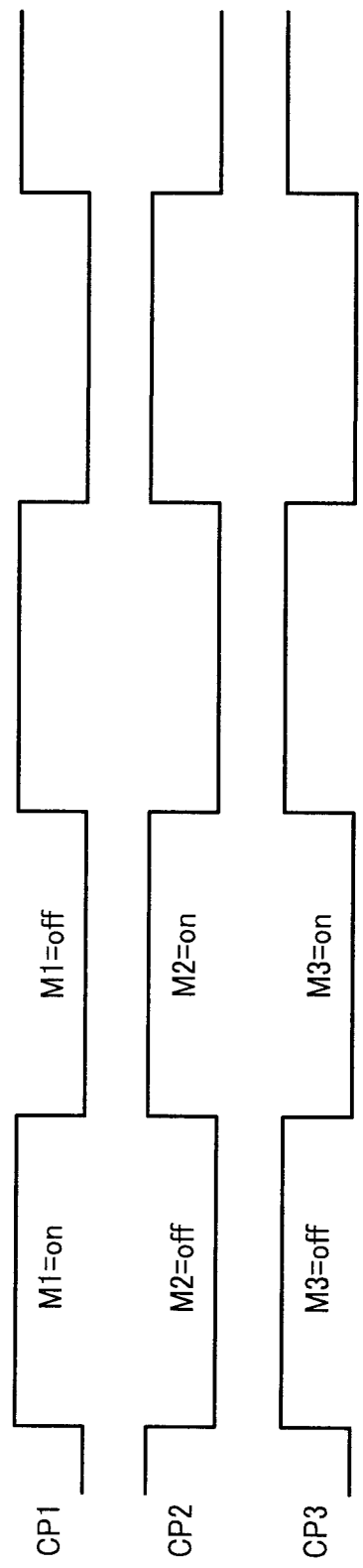
FIG. 4 is a timing chart illustrating an example of a waveform of pulse signals.

The switching regulators 1 and 1A depicted in FIGS. 1 and 2, respectively, serve as step-down switching regulators of an asynchronous rectifying type. Referring now to FIGS. 3 and 4, a description is given of a synchronous rectifying-type switching regulator 1B according to yet another illustrative embodiment.

FIG. 3 is a circuit diagram of the switching regulator 1B. The switching regulator 1B, serving as a step-down switching regulator of a synchronous rectifying type, includes a synchronous rectifier transistor M2, a control circuit 2B, a second drive circuit 21, a second reference voltage generator circuit 22, a PMOS transistor M3, and a first power supply circuit 4B. The other elements of the switching regulator 1B are the same as those of the switching regulator 1A depicted in FIG. 2. The first power supply circuit 4B includes a NMOS transistor M5. The other elements of the first power supply circuit 4B are the same as those of the first power supply circuit 4A depicted in FIG. 2.

The switching regulator 1B, serving as a synchronous rectification type step-down switching regulator formed by integrating a high-voltage MOS transistor and a low-voltage MOS transistor in a single semiconductor chip, converts an input voltage VH applied to the input terminal IN into a predetermined constant voltage and outputs an output voltage Vout from the output terminal OUT. The switching transistor M1 includes a NMOS transistor performing switching operation for output control of the input voltage VH. The synchronous rectifier transistor M2 is a NMOS transistor.

The control circuit 2B controls switching of the switching transistor M1 and the synchronous rectifier transistor M2 so as to maintain the output voltage Vout at the predetermined voltage. For example, the control circuit 2B generates pulse signals CP1, CP2, and CP3 being PWM pulse signals for PWM control, and outputs the pulse signals CP1, CP2, and CP3, respectively. The first drive circuit 3 is a buffer circuit for on-off control of the synchronous rectifier transistor M1 based on the pulse signal CP1 transmitted from the control circuit 2B, and includes a low-voltage transistor. The second drive circuit 21 is a buffer circuit for on-off control of the synchronous rectifier transistor M2 based on the pulse signal CP2 transmitted from the control circuit 2B, and includes a low-voltage transistor. The second reference voltage generator circuit 22 generates a predetermined second reference voltage Vr2 proportional to the output voltage Vout output from the output terminal. The PMOS transistor M3 is turned on and off based on the pulse signal CP3 transmitted from the control circuit 2B.

It is to be noted that the synchronous rectifier transistor M2 serves as a synchronous rectifier switch, the control circuit 2B and the second reference voltage generator circuit 22 serve as a controller, the first power supply circuit 4B serves as a voltage generator, the second reference voltage generator circuit 22 serves as a second reference voltage generator circuit, the second drive circuit 21 serves as a second drive circuit, the NMOS transistor M5 serves as a second source follower circuit, and the PMOS transistor M3 serves as a switching circuit, respectively. In the switching regulator 1B, circuits other than the inductor L1 and the output capacitor Co may be integrated in a single IC chip. Alternatively, circuits other than the switching transistor M1 and/or the synchronous rectifier transistor M2, the inductor L1, and the output capacitor Co may be integrated in a single IC chip.

The switching transistor M1 and the synchronous rectifier transistor M2 are connected in series between the input terminal IN and the ground potential Vss. The inductor L1 is connected between the junction node LX of the switching transistor M1 and the synchronous rectifier transistor M2, and the output terminal OUT. The output capacitor Co is connected between the output terminal OUT and the ground potential Vss.

The first power source circuit 4B generates predetermined power supply voltages VL1 and VL2 smaller than a withstand voltage of the low-voltage MOS transistor and outputs the power supply voltages VL1 and VL2. The power supply voltage VL1 is input to a positive side power supply input terminal of the second drive circuit 21 and also input to a positive side power supply input terminal of the first drive circuit 3 through the PMOS transistor M3, to a gate of which the pulse signal CP3 is transmitted from the control circuit 2B. It is to be noted that the power supply voltage VL1 serves as a first power supply voltage, and the power supply voltage VL2 serves as a second power supply voltage.

The bootstrap capacitor C1 is connected between the positive side power supply input terminal of the first drive circuit 3 and the junction node LX, the negative side power supply input terminal of the first drive circuit 3 is connected to the junction node LX, and the negative side power supply input terminal of the second drive circuit 21 is connected to the ground potential Vss, respectively. The pulse signal CP1 transmitted from the control circuit 2B is input to the input terminal of the first drive circuit 3, and the output terminal of the first drive circuit 3 is connected to the gate of the switching transistor M1. The pulse signal CP2 transmitted from the control circuit 2B is input to an input terminal of the second drive circuit 21, and an output terminal of the second drive circuit 21 is connected to a gate of the synchronous rectifier transistor M2.

In the first power source circuit 4B, the operational amplifier 11 and the first reference voltage generator circuit 12 are high-voltage MOS transistors, and activated by input voltages VH, respectively. The first reference voltage Vr1 generated by the first reference voltage generator circuit 12 is input to the non-inverting input terminal of the operational amplifier 11, and the output terminal of the operational amplifier 11 is connected to each gate of the NMOS transistors M4 and M5. The resistors R1 and R2 are connected in series between the output terminal of the operational amplifier 11 and the ground potential Vss, and the junction node between the resistors R1 and R2 is connected to the inverting input terminal of the operational amplifier 11.

The NMOS transistors M4 and M5 are high-voltage MOS transistors, respectively, a drain of each of which is connected to an input voltage VH. Since the operational amplifier 11, the first reference voltage generator circuit 12, and the resistors R1 and R2 form a constant voltage circuit, a same constant voltage is applied to each gate of the NMOS transistors M4 and M5. Thus, the power supply voltage VL1 is output from the source of the NMOS transistor M4, and the power supply voltage VL2 is output from the source of the NMOS transistor M5. That is, the first power supply circuit 4B includes two source follower circuits of high-voltage NMOS transistors provided in the output terminal of the operational amplifier 11, the first reference voltage generator circuit 12, and the resistors R1 and R2, serving as a constant voltage circuit.

Since the first power source circuit 4B includes the NMOS transistors M4 and M5, serving as source follower circuits and consisting of the high-voltage NMOS transistor, even when the operational amplifier 11 includes a high-voltage transistor having a decreased frequency characteristic, phase compensation of the operational amplifier 11, the first reference voltage generator circuit 12, and the resistors R1 and R2, serving as a constant voltage circuit, can be easily achieved, and response speed can be increased.

Further, by adding the NMOS transistors M4 and M5 to the first power source circuit 4B, a power supply voltage to be output can easily increase. Note that the power supply voltages VL1 and VL2 are set to be smaller than or equal to the withstand voltages of the low-voltage MOS transistor, respectively.

The second reference voltage generator circuit 22 is activated by the power supply voltage VL2. The second reference voltage generator circuit 22 generates a second reference voltage Vr2 to be used as a reference voltage of the switching regulator 1B and for generation of various bias currents, and the like. Since the second reference voltage generator circuit 22 includes a low-voltage transistor, the switching regulator 1B can decrease circuit area and consumption current while achieving high-speed response.

Operation of the switching regulator 1B is now described using FIG. 4. FIG. 4 is a timing chart illustrating an example of a waveform of the pulse signals CP1, CP2, and CP3.

When the pulse signal CP1 is at a high level, the pulse signal CP2 is low and the pulse signal CP3 is high. That is, the switching transistor M1 and the synchronous rectifier transistor M2 switch on and off complementarily, while the switching transistor M1 and the PMOS transistor M3 switch on and off complementarily.

When the pulse signal CP1 is at a high level, the switching transistor M1 is turned on to be in a conductive state, whereas the synchronous rectifier transistor M2 and the PMOS transistor M3 are turned off to be in a shutoff state. Thus, a voltage applied at an end of the bootstrap capacitor C1, connected to the positive side power supply input terminal of the first drive circuit 3, increases above the power supply voltage VL1, and the first drive circuit 3 is supplied with an electrical charge accumulated in the bootstrap capacitor C1.

When the pulse signal CP1 is at a low level, the switching transistor M1 is turned off to be in a shutdown state, whereas the synchronous rectifier transistor M2 and the PMOS transistor M3 are turned on to be in a conductive state, respectively. Therefore, a voltage applied to the junction node LX is almost equal to the power source voltage Vss, and accordingly, the first power supply circuit 4B supplies the bootstrap capacitor C1 with the power supply voltage VL1. Since instead of the diode D2 depicted in FIG. 1 the switching regulator 1B includes the PMOS transistor M3, the switching regulator 1B decreases a voltage drop occurring in the diode D2, which results in an increased amount of electrical charge accumulated in the bootstrap capacitor C1, thereby improving performance of the switching regulator 1B.

When the pulse signal CP2 is at a high level, an output signal transmitted from the output terminal of the second drive circuit 21 changes to high to instantly charge a gate capacity of the synchronous rectifier transistor M2, so that a consumption current of the second drive circuit 21 exceeds a maximum possible output current of the first power supply circuit 4B. However, since the PMOS transistor M3 is turned on, the bootstrap capacitor C1 also supplies power to the second drive circuit 21, thereby preventing a great reduction in the power supply voltage VL1 supplied by the first power source circuit 4B. Similarly, when the output signal transmitted from the first drive circuit 3 changes to a high level, although a consumption current of the first drive circuit 3 instantly increases, since the bootstrap capacitor C1 supplies power to the first drive circuit 3, the output voltage VL1 of the first power supply circuit 4B is not affected.

According to the illustrative embodiment described above, the switching regulator 1B achieves an effect similar to that of the switching regulator 1 depicted in FIG. 1. In addition, instead of the diode D2, the switching regulator 1B uses the PMOS transistor M3 as a switching member for charging the bootstrap capacitor C1, thereby decreasing a voltage drop when the PMOS transistor M3 is turned on while improving performance of the switching regulator 1B. In addition, the bootstrap capacitor C1 can supply an electrical current to the first power source circuit 4B, and the second drive circuit 21, serving as a load circuit, can supply electrical current greater than the maximum possible output current of the first power supply circuit 4B in a short period of time.

Figure 5:
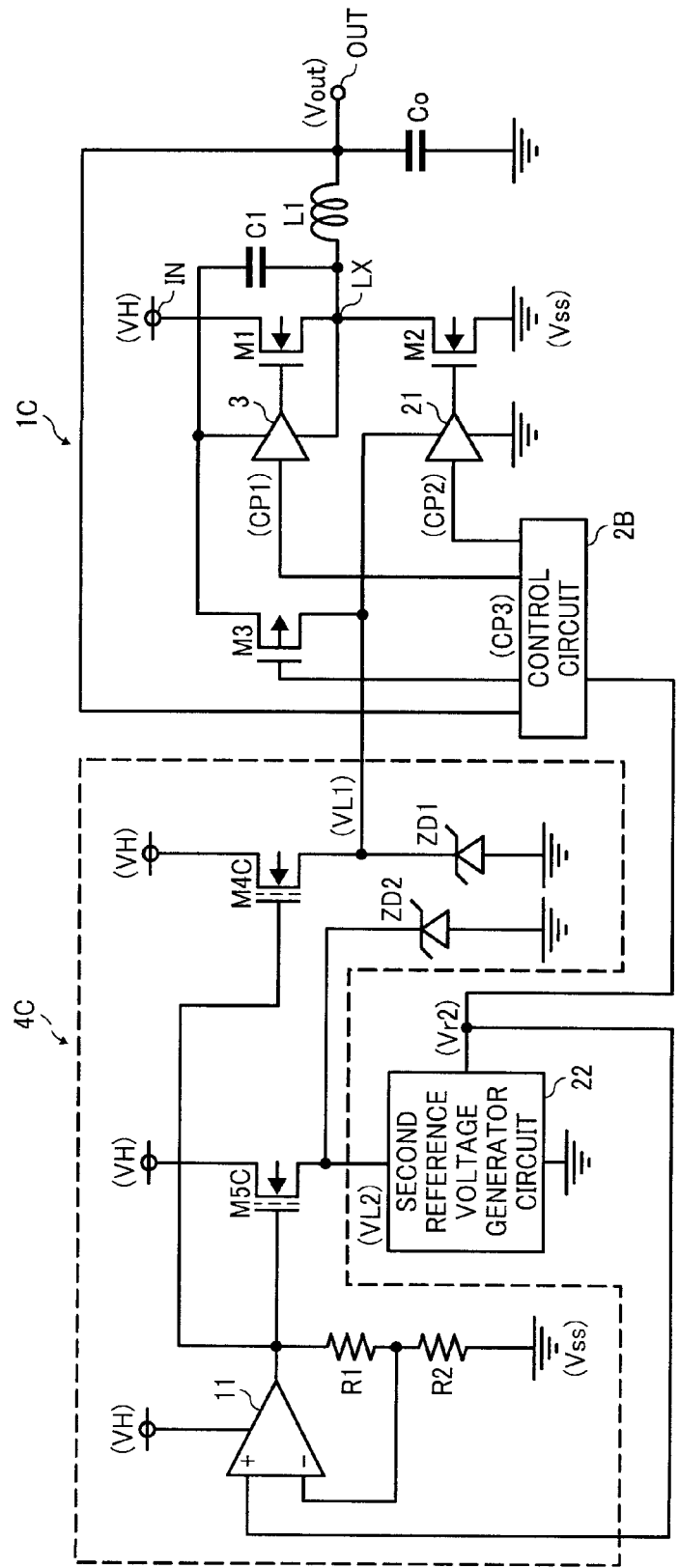
FIG. 5 is a circuit diagram of a step-down switching regulator according to yet another illustrative embodiment of the present disclosure.

Referring to FIG. 5, a description is now given of a switching regulator 1C according to yet another illustrative embodiment.

FIG. 5 is a circuit diagram of the switching regulator 1C. The switching regulator 1C includes a first power supply circuit 4C. The first power supply circuit 4C includes high-voltage depletion type NMOS transistors M4C and M5C replacing the NMOS transistors M4 and M5, respectively, and Zener diodes ZD1 and ZD2. The first power supply circuit 4C does not include the first reference voltage generator circuit 12. The other elements of the switching transistor 1C are the same as those of the switching transistor 1B depicted in FIG. 3. According to this illustrative embodiment, the second reference voltage Vr2 generated by the second reference voltage generator circuit 22 is input to the non-inverting input terminal of the operational amplifier 11.

The switching regulator 1C, serving as a synchronous rectification type step-down switching regulator formed by integrating a high-voltage MOS transistor and a low-voltage MOS transistor in a single semiconductor chip, converts an input voltage VH applied to an input terminal IN into a predetermined constant voltage and outputs an output voltage Vout from an output terminal OUT.

It is to be noted that the first power supply circuit 4C serves as a voltage generator, the NMOS transistor M4C serves as a first source follower circuit, the NMOS transistor M5C serves as a second source follower circuit, and the Zener diodes ZD1 and ZD2 serve as clamp circuits, respectively. In the switching regulator 1C, circuits other than the inductor L1 and the output capacitor Co may be integrated in a single IC. Alternatively, circuits other than the switching transistor M1 and/ or the synchronous rectifier transistor M2, the inductor L1, and the output capacitor Co may be integrated in a single IC chip.

In the first power source circuit 4C, the operational amplifier 11 is a high-voltage MOS transistor activated by input voltages VH. The second reference voltage Vr2 generated by the second reference voltage generator circuit 22 is input to the non-inverting input terminal of the operational amplifier 11, and an output terminal of the operational amplifier 11 is connected to respective gates of the NMOS transistors M4C and M5C. The resistors R1 and R2 are connected in series between the output terminal of the operational amplifier 11 and a ground potential Vss, and the inverting input terminal of the operational amplifier 11 is connected to a junction node between the resistors R1 and R2.

The NMOS transistors M4C and M5C are high-voltage NMOS transistors, a drain of each of which is connected to an input voltage VH. Since the operational amplifier 11, the second reference voltage generator circuit 22, and the resistors R1 and R2 form a constant voltage circuit, a same constant voltage is input to each gate of the NMOS transistors M4 and M5. A cathode of the Zener diode ZD1 is connected to a source of the NMOS transistor M4C, and an anode of the Zener diode ZD1 is connected to a ground potential Vss.

The first power supply circuit 4C outputs a power supply voltage VL1 from a junction node between the source of the NMOS transistor M4C and the cathode of the Zener diode ZD1. Also, a cathode of the Zener diode ZD2 is connected to a source of the NMOS transistor M5C, and an anode of the Zener diode ZD2 is connected to a ground potential Vss. The first power supply circuit 4C outputs a power supply voltage VL2 from a junction node between the source of the NMOS transistor M5C and the cathode of the Zener diode ZD2. That is, the first power supply circuit 4C includes two source follower circuits of the high-voltage depletion type NMOS transistor provided in an output terminal of the operational amplifier 11, the second reference voltage generator circuit 22, and the resistors R1 and R2, serving as a constant voltage circuit.

Since the first power supply circuit 4C includes two source follower circuits of the high-voltage depletion type NMOS transistors provided in the output terminal of the operational amplifier 11, the second reference voltage generator circuit 22, and the resistors R1 and R2, serving as a constant voltage circuit, an output voltage of the operational amplifier 11 can be set close to the power supply voltages VL1 and VL2 output from the NMOS transistors M4C and M5C, serving as source follower circuits, respectively. However, when the operational amplifier 11 is not activated in a stand-by state, the output voltages VL1 and VL2, being source voltages of the high-voltage depletion type NMOS transistors M4C and M5C, are greater than the output voltage of the operational amplifier 11. Therefore, the Zener diodes ZD1 and ZD2, serving as clamp circuits, keep the power source voltages VL1 and VL2 below a withstand voltage of a low-voltage MOS transistor. Note that a circuit without the Zener diodes ZD1 and ZD2 may serve as a clamp circuit. In addition, even when the operational amplifier 11, the second reference voltage generator circuit 22, and the resistors R1 and R2, serving as a constant voltage circuit, are not activated in a stand-by state and the like, the provision of the Zener diodes ZD1 and ZD2 at the output terminal of the NMOS transistors M4C and M5C, serving as source follower circuits, prevents an excessive increase in the power supply voltage output from the first power supply circuit 4C.

According to the above-described illustrative embodiments, the switching regulators 1B and 1C depicted in FIGS. 3 and 5 include a switching circuit, that is, the PMOS transistor M3, for preventing backflow of current from the capacitor C1 to a voltage generator, that is, the first power supply circuits 4B and 4C, thereby achieving higher performance of the switching regulators 1B and 1C than when the switching regulators 1B and 1C use a diode, for example, the diode D2 depicted in FIG. 1. In addition, when the PMOS transistor M3 is turned on to be in a conductive state, the PMOS transistor M3 can drive a current greater than a possible output current of the voltage generator for a short period of time. Alternatively, one end of the capacitor C1 may be directly connected to an output terminal of a source follower circuit, that is, the NMOS transistors M4 and M4C depicted in FIGS. 3 and 5, and therefore, the switching regulator 1B can omit the PMOS transistor M3.

Additionally, since the high-voltage depletion type NMOS transistor M5C is activated when powered on, even when the second reference voltage Vr2 input to the non-inverting input terminal of the operational amplifier 11 is 0 V, the second reference voltage generator circuit 22 is supplied with an electrical current to be activated, so that the first power supply circuit 4C can be activated. As a result, the second reference voltage generator circuit 22 can use a stable reference voltage Vr2 as a reference voltage for the operational amplifier 11, serving as a constant voltage circuit. The other operations of the switching regulator 1C are equivalent to those of the switching regulator 1B depicted in FIG. 3.

According to this illustrative embodiment, the switching regulator 1C achieves an effect similar to that of the switching regulator 1B. In addition, the switching regulator 1C does not include the first reference voltage generator circuit 12 of the switching regulator 1B, thereby decreasing circuit area while reducing consumption current.

Referring back to FIG. 2, instead of the high-voltage NMOS transistor M4, the switching regulator 1A may use the high-voltage depletion type NMOS transistor M4C depicted in FIG. 5. When doing so, the Zener diode ZD1 depicted in FIG. 5 may be provided between the source of the high-voltage depletion type NMOS transistor M4C and the ground potential Vss.

Further, the switching regulator 1A depicted in FIG. 2 may include the PMOS transistor M3 depicted in FIG. 3, so that a source of the NMOS transistor M4 through the PMOS transistor M3 may be connected to a junction node between the positive side power supply input terminal of the first drive circuit 3 and the bootstrap capacitor C1. Under these conditions, like the control circuit 2B of the switching regulator 1B depicted in FIG. 3, the control circuit 2 of the switching regulator 1A transmits the pulse signal CP3 to the PMOS transistor M3. In addition, the switching regulator 1A may include the second drive circuit 21 depicted in FIG. 3, serving as a load circuit, connected to a junction node between the PMOS transistor M3 and the NMOS transistor M4, so as to be supplied with power from the first power supply circuit 4A and the bootstrap capacitor C1.

Furthermore, in the switching transistor 1B depicted in FIG. 3 and the switching transistor 1C depicted in FIG. 5, the first power supply circuits 4B and 4C generate two power supply voltages VL1 and VL2 and output the power supply voltages VL1 and VL2, respectively. However, the first power supply circuits 4B and 4C may generate three or more power supply voltages and output the power supply voltages. Thus, the first power supply circuits 4B and 4C may include as many NMOS transistors, serving as source follower circuits, as the number of power supply voltages to be output.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese Patent Application No. 2007-304055 filed on Nov. 26, 2007 in the Japan Patent Office, the entire contents of which are hereby incorporated herein by reference.

What is claimed is:

1. A step-down switching regulator comprising:
   a switching element formed of a high-voltage NMOS transistor and turned on and off based on a control signal input to a gate, configured to charge an inductor with an input voltage not smaller than a withstand voltage of a low-voltage MOS transistor but smaller than a withstand voltage of a high-voltage MOS transistor input to an input terminal;
   a rectifier configured to discharge the inductor when the switching element is turned off to stop charging the inductor;
   a voltage generator configured to generate a predetermined first constant power supply voltage having a predetermined voltage value not greater than a withstand voltage of the low-voltage MOS transistor;
   a first drive circuit formed of a low-voltage MOS transistor and configured to receive the predetermined first constant power supply voltage from the voltage generator and turn on and off the switching element based on the input control signal;
   a capacitor connected in parallel with the first drive circuit and configured to store charge from the voltage generator to supply power to the first drive circuit, one end of which is connected to a junction node between the switching element and the inductor and the other end of which is supplied with the first constant power supply voltage from the voltage generator; and
   a controller configured to generate the control signal for turning on and off the switching element and output the control signal to the first drive circuit, such that the input voltage is converted into a predetermined constant voltage to be output from an output terminal.

2. The step-down switching regulator according to claim 1, further comprising:
   a diode configured to transmit the first power supply voltage from the voltage generator to the capacitor.

3. The step-down switching regulator according to claim 1, further comprising:
   a switching circuit turned on and off based on the control signal transmitted from the control circuit to supply the first power supply voltage to the capacitor.

4. The step-down switching regulator according to claim 3, further comprising:
   a load circuit connected to a junction node between the first power supply voltage and the switching circuit and supplied with power from the voltage generator and the capacitor.

5. The step-down switching regulator according to claim 3, further comprising:
   a synchronous rectifier switching element formed of a high-voltage NMOS transistor and turned on and off based on a control signal input to a gate; and
   a second drive circuit configured to turn on and off the synchronous rectifier switching element based on the control signal transmitted from the control circuit and supplied with power by the voltage generator and the capacitor,
   wherein the controller orders the switching circuit to be turned on and off, synchronized with on-off switching of the synchronous rectifier switch and contrary to on-off switching of the switching element.

6. The step-down switching regulator according to claim 5, wherein the second drive circuit is formed of the low-voltage MOS transistor.

7. A step-down switching regulator comprising:
   a switching element formed of a high-voltage NMOS transistor and turned on and off based on a control signal input to a gate, configured to charge an inductor with an input voltage not smaller than a withstand voltage of a low-voltage MOS transistor but smaller than a withstand voltage of a high-voltage MOS transistor input to an input terminal;
   a rectifier configured to discharge the inductor when the switching element is turned off to stop charging the inductor;
   a voltage generator configured to generate a predetermined first power supply voltage not greater than a withstand voltage of the low-voltage MOS transistor;
   a first drive circuit formed of a low-voltage MOS transistor and configured to turn on and off the switching element based on the input control signal;
   a capacitor connected in parallel with the first drive circuit and configured to store charge from the voltage generator to supply power to the first drive circuit, one end of which is connected to a junction node between the switching element and the inductor and the other end of which is supplied with the first power supply voltage generated by the voltage generator;
   a controller configured to generate the control signal for turning on and off the switching element and output the control signal to the first drive circuit, such that the input voltage is converted into a predetermined constant voltage to be output from an output terminal;
   a constant voltage circuit configured to generate a predetermined constant voltage and output the predetermined constant voltage; and
   a first source follower circuit formed of an NMOS transistor of the high-voltage MOS transistor and configured to receive the output voltage generated by the constant voltage circuit at a gate and receive the input voltage at a drain while outputting the first power supply voltage from a source.

8. The step-down switching regulator according to claim 7, wherein the voltage generator comprises: a second source follower circuit formed of an NMOS transistor of the high-voltage MOS transistor and configured to receive the output voltage generated by the constant voltage circuit at a gate and receive the input voltage at a drain while outputting a predetermined second power supply voltage not greater than the withstand voltage of the low-voltage MOS transistor from a source.

9. The step-down switching regulator according to claim 8, further comprising:
   a second reference voltage generator circuit activated with the second power supply voltage and configured to generate a predetermined second reference voltage, wherein the controller generates the control signal such that the second reference voltage is proportional to the output voltage output from the output terminal.

10. The step-down switching regulator according to claim 9, wherein the second reference voltage generator circuit is formed of the low-voltage MOS transistor.

11. The step-down switching regulator according to claim 8, wherein the voltage generator comprises: at least three source follower circuits formed of an NMOS transistor of the high-voltage MOS transistor and configured to receive the output voltage generated by the constant voltage circuit at a gate and receive the input voltage at a drain while outputting a predetermined power supply voltage not greater than the withstand voltage of the low-voltage MOS transistor from a source.

12. The step-down switching regulator according to claim 7, wherein the constant voltage circuit comprises:
   a first reference voltage generator circuit configured to generate a predetermined first reference voltage;
   a proportional voltage generator circuit configured to generate a voltage proportional to the output voltage generated by the constant voltage circuit; and
   an operational amplifier configured to output the constant voltage such that the proportional voltage generated by the proportional voltage generator circuit is equal to the first reference voltage,
   wherein the first reference voltage generator circuit and the operational amplifier are formed of the high-voltage MOS transistors, respectively.

13. The step-down switching regulator according to claim 7, wherein the first source follower circuit is formed of a high-voltage depletion type NMOS transistor.

14. The step-down switching regulator according to claim 13, wherein the voltage generator comprises: a clamp circuit configured to keep the first power source voltage below the withstand voltage of the low-voltage MOS transistor.

15. The step-down switching regulator according to claim 14, wherein the clamp circuit is formed of a Zener diode connected between an output terminal of the voltage generator and a ground potential.

16. The step-down switching regulator according to claim 1, wherein the voltage generator comprises:
   a constant voltage circuit configured to generate a predetermined constant voltage and output the predetermined constant voltage; and
   a first source follower circuit formed of an NMOS transistor of the high-voltage MOS transistor and configured to receive the output voltage generated by the constant voltage circuit at a gate and receive the input voltage at a drain while outputting the first power supply voltage from a source.

* * * * *